United States Patent [19]

Paré et al.

[11] Patent Number: 5,309,786
[45] Date of Patent: May 10, 1994

[54] SELF-ADJUSTING PARKING BRAKE ACTUATOR

[75] Inventors: Thomas E. Paré, Dearborn Heights; J. Frank Mack, Rochester Hills; Michael L. Stenzel, Holly, all of Mich.

[73] Assignee: Dura Mechanical Components, Inc., Troy, Mich.

[21] Appl. No.: 27,962

[22] Filed: Mar. 8, 1993

[51] Int. Cl.$^5$ .............................................. G05G 1/14
[52] U.S. Cl. ...................................... 74/512; 74/513; 74/516; 74/501.5 R
[58] Field of Search .......... 74/512, 513, 516, 501.5 R, 74/535, 540, 542, 575; 188/2 D

[56] References Cited

U.S. PATENT DOCUMENTS

| | | | |
|---|---|---|---|
| 2,026,350 | 12/1935 | Looschen | 192/12 |
| 2,868,887 | 1/1959 | Greshel | 179/90 |
| 3,136,177 | 6/1964 | Roberts et al. | 74/531 |
| 3,333,512 | 8/1967 | Parsons | 92/140 |
| 3,439,557 | 4/1969 | Bookout | 74/531 |
| 3,875,820 | 4/1975 | Morden | 74/516 X |
| 3,974,713 | 8/1976 | Toohey | 74/512 |
| 4,109,529 | 8/1978 | Niklaus | 74/388 R |
| 4,612,823 | 9/1986 | De Leeuw | 74/533 |
| 4,841,798 | 6/1989 | Porter et al. | 74/501.5 R |
| 4,850,242 | 7/1989 | Hass et al. | 74/512 |
| 4,958,607 | 9/1990 | Lundberg | 74/513 X |
| 5,131,288 | 7/1992 | Barlas | 74/512 |

FOREIGN PATENT DOCUMENTS

3-284455 12/1991 Japan ................................. 74/512
4-90949 3/1992 Japan ................................. 74/512

Primary Examiner—Vinh T. Luong
Attorney, Agent, or Firm—David A. Greenlee

[57] ABSTRACT

A parking brake actuator for a cable-operated vehicle parking brake, comprises a mounting bracket on the vehicle, a sector gear mounted on the mounting bracket for rotation about an axis to variably tension the cable. A pedal lever is coaxially pivoted on the mounting bracket for independent rotation between a brake release position and a plurality of brake apply positions. A spiral-wound spring extends between the operating lever and the drive plate for rotating the drive plate relative to the lever to apply an initial tension on the cable. A drive clutch couples the drive plate to the lever upon initial rotation of the lever out of brake release position to enable rotation of the lever to increasingly tension the cable and apply the parking brake. The drive clutch includes a pinion gear mounted on the lever in engagement with the sector gear. A torsion clutch spring is wrapped about the pinion gear hub and has one end fixed to the lever and a free end, and normally contracts to prevent rotation of the pinion gear, thus operatively coupling the drive plate to the lever. A release pin on the mounting bracket is engaged by the torsion clutch spring free end in the brake release position to expand the torsion clutch spring to free the pinion for rotation, thus decoupling the drive plate from the lever. A similar position control clutch employing a torsion spring releasably maintains the drive plate in brake apply position.

12 Claims, 5 Drawing Sheets

SELF-ADJUSTING PARKING BRAKE ACTUATOR

BACKGROUND OF THE INVENTION

This invention relates generally to parking brake actuators and, more particularly, to a parking brake actuator that is continuously self-adjustable for cable slack.

Parking brakes are customarily provided on automotive vehicles to provide a device for securing the vehicle against inadvertent movement when parked on a grade, whether or not the vehicle transmission is engaged or not. Recently, because of space limitations, parking brakes have been developed that utilize a foot-operated flexible cable to operate the remote parking brake. Many of these have a self-adjust feature to accommodate cable slack which occurs during installation or over the life of the vehicle, due to cable stretch or cable system geometry change caused by use.

Such a parking brake is illustrated in U.S. Pat. No. 4,612,823 to De Leeuw et al. This parking brake actuator features a pedal actuator lever that drivingly engages a cable-connected drive plate through a pawl-and-sector connection. Another pawl-and-sector device provides position control to hold the parking brake in applied position and is released to disengage the parking brake.

The driving pawl-and-sector device automatically disengages in brake released position to enable a clock spring to take up slack. The pawl automatically engages the peripheral sector teeth when the pedal lever is depressed to apply the parking brake. This pawl-and-sector driving engagement is subject to the pawl skipping a sector tooth during initial engagement.

This "skip" is inherent in this type of drive, which enables a positive driving engagement between the pedal lever and the drive plate periphery only at spaced intervals determined by sector tooth spacing. The "skip" is caused by the interaction of the pawl and the sector teeth resulting from pawl and tooth geometry, pawl inertia and by the spring rate of the pawl spring. The skipping of a tooth is undesirable if repeatability of the parking brake application action (i.e. effort and motion) is desired.

It would be desirable to provide a self-adjusting parking brake actuator in which the drive clutch comprises a member which continuously engages the periphery of the drive plate.

It would also be desirable to provide a drive clutch which comprises a member that continuously and positively engages the periphery of the drive plate to provide a continuous mechanical driving connection between the operating lever and the drive plate.

SUMMARY OF THE INVENTION

It is therefore an object of this invention to provide a self-adjusting parking brake actuator in which the drive clutch comprises a member which continuously engages the periphery of the drive plate.

Another object of this invention is to provide a drive clutch which comprises a member that continuously and positively engages the periphery of the drive plate to provide a continuous mechanical driving connection between the operating lever and the drive plate.

In one aspect, this invention features a parking brake actuator for variably tensioning a cable to apply and release a vehicle parking brake which comprises a drive plate attached to the cable that is mounted on the vehicle for rotation between positions variably tensioning the cable. An operating lever is mounted on the vehicle for rotation between a brake release position and a plurality of brake apply positions. A spring biases the independent drive plate relative to the operating lever to apply an initial cable tension. The drive clutch connects the lever to the periphery of the drive plate immediately upon rotation of the lever out of brake release position, regardless of the relative positions of the lever and the drive plate in brake release position. This enables further rotation of the lever to increase cable tension to apply the parking brake. A clutch release is mounted on the vehicle for automatically releasing the clutch upon movement of the lever to brake release position, while a position control device releasably maintains the drive plate in brake apply position.

Preferably, the drive plate and operating lever are independently mounted on the vehicle for rotation about a common axis and the position control device comprises a one-way position control clutch which is mounted on the vehicle in engagement with the drive plate periphery to permit rotation of the drive plate to increase cable tension, but normally prevent any rotation of the plate to reduce cable tension. Also, a release is provided for selectively releasing the position control clutch to permit rotation of the drive plate to reduce cable tension.

In another aspect of this invention, the drive clutch comprises a member which continuously and positively engages the periphery of the drive plate to provide a continuous mechanical driving connection between the operating lever and the drive plate.

In yet another aspect of this invention, the drive plate has a plurality of gear teeth on its periphery forming a sector gear, and the drive clutch comprises a pinion rotatably mounted on the operating lever in engagement with the sector gear and a friction device which normally operates to engage the pinion to prevent its rotation, but is disabled by the clutch release to enable pinion rotation.

Preferably, the pinion has a hub; the friction device is a torsion clutch spring which is wrapped about the pinion gear hub, has a fixed end secured to the lever and a free end, and normally contracts to prevent rotation of the pinion gear, thus coupling the drive plate to the lever for rotation therewith; and the clutch release is a member mounted on the vehicle which is engaged by the torsion clutch spring free end in the brake release position of the lever to expand the spring to free the pinion for rotation, thus decoupling the drive plate from the lever.

In still another aspect, this invention features a parking brake actuator for variably tensioning a cable to apply and release a vehicle parking brake, which comprises a mounting bracket on the vehicle, and a drive plate attached to the cable that has a plurality of gear teeth on its periphery forming a sector gear that is mounted on the mounting bracket for rotation about an axis to variably tension the cable. An operating lever is coaxially pivotally mounted on the mounting bracket for independent rotation between a brake release position and a plurality of brake apply positions. A spiral-wound spring extends between the operating lever and the drive plate for rotating the drive plate relative to the lever to apply an initial tension on the cable. A drive clutch couples the drive plate to the lever for movement therewith upon initial rotation of the lever out of brake release position to enable rotation of the lever to increasingly tension the cable and apply the parking brake. The drive clutch includes a pinion gear rotatably mounted on the lever in engagement with the sector gear which has a hub and a torsion clutch spring which is wrapped about the pinion gear hub, has a fixed end secured to the lever and a free end, and normally contracts to prevent rotation of the pinion gear, thus coupling the drive plate to the lever for rotation therewith. A release pin is mounted on the mounting bracket which is engaged by the torsion clutch spring free end in the brake release position of the lever to expand the torsion clutch spring to free the pinion for rotation, thus decoupling the drive plate from the lever. A position control device which releasably maintains the drive plate in brake apply position comprises a second pinion gear rotatably mounted on the mounting bracket in engagement with the sector gear which has a hub and a second torsion clutch spring, having a fixed end secured to the mounting bracket and a free end, which is wrapped about the second pinion gear hub and normally enables movement of the drive plate to increase cable tension, but contracts to prevent rotation of the pinion gear and prevent movement of the drive plate to decrease cable tension. A release is mounted on the mounting bracket and is selectively engageable with the second torsion clutch spring free end to expand the second torsion clutch spring to free the pinion for rotation and enable movement of the drive plate to decrease cable tension.

These and further objects and features of this invention will become more readily apparent upon reference to the following detailed description of a preferred embodiment, as illustrated in the accompanying drawings, in which:

DETAILED DESCRIPTION OF A PREFERRED EMBODIMENT

Referring now to the drawings, a parking brake actuator 10, according to this invention comprises a mounting bracket 12 and a cover plate 14, which mount the operating mechanisms which function to variably tension an operating cable 16 for a vehicle parking brake, not illustrated. The operating mechanisms comprise an operating pedal lever 18, a drive plate 20, a take-up spring 22, a drive clutch 24 and a position control clutch 26.

Lever 18 includes a central octagonal mounting aperture 28 and a lever arm 30 which terminates in a pad 32 that mounts a rubber foot tread 34. At its other end, lever 18 mounts a brake switch operating arm 36. Drive plate 20 comprises a sector gear 38 and a cable guide 40. Sector gear 38 has a plurality of peripheral gear teeth 42, a central mounting aperture 44 and a peripheral flange 46. Cable guide 40 has a peripheral flange 48 and mounting holes 50 which mate with mounting holes 52 in sector 38 to receive mounting rivets 54. Sector 38 and cable guide 40 have respective retaining slots 56, 58 located at one end of flanges 46, 48 to receive the cable head 60 mounted on the end of cable 16 (see FIGS. 2 and 3). Cable 16 extends from slots 56, 58 and lies in a channel 62 between flanges 46, 48.

Figure 2:
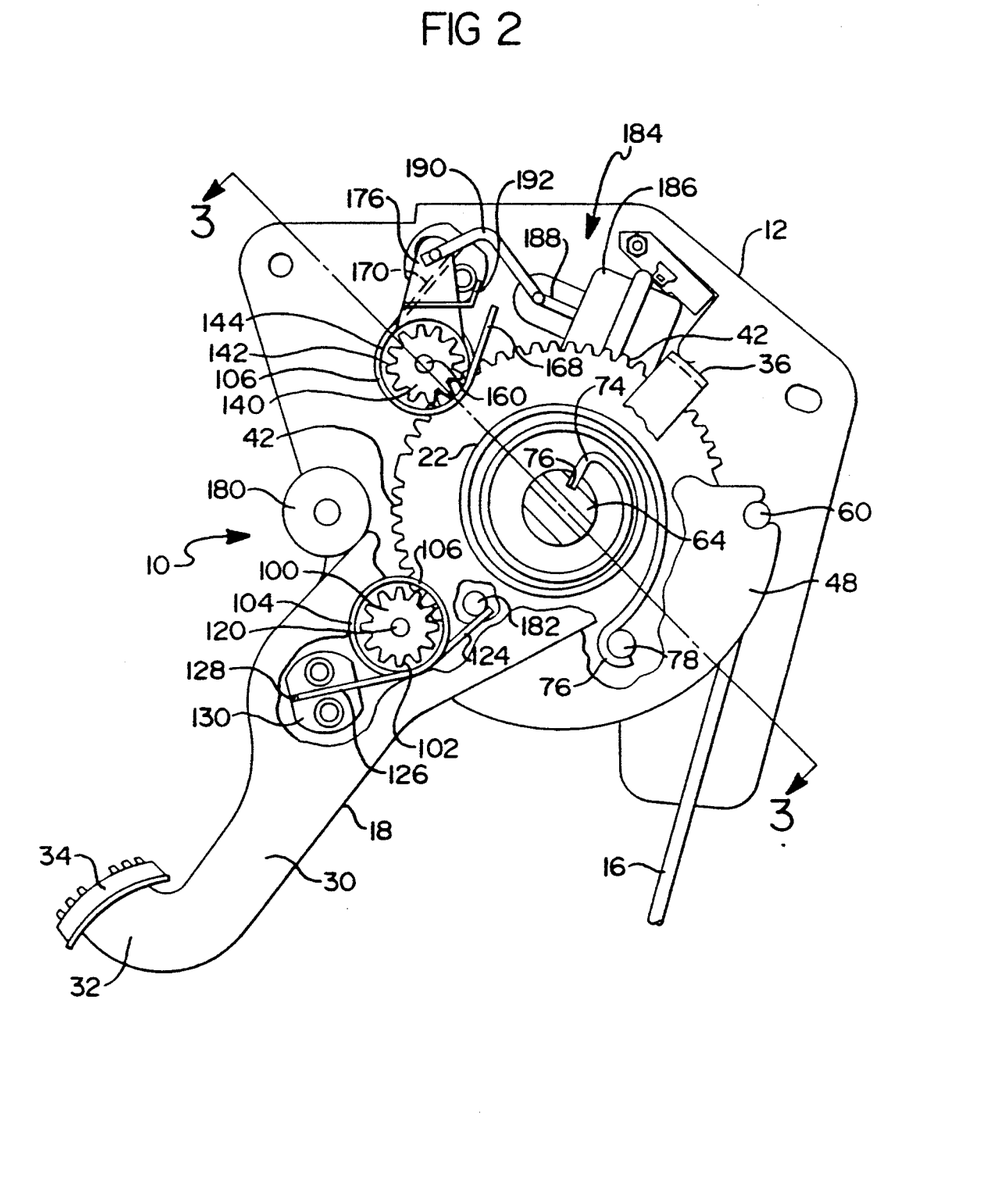
FIG. 2 is a side view of the parking brake actuator of FIG. 1 shown in brake release position, partially broken away to illustrate details of construction.
Figure 3:
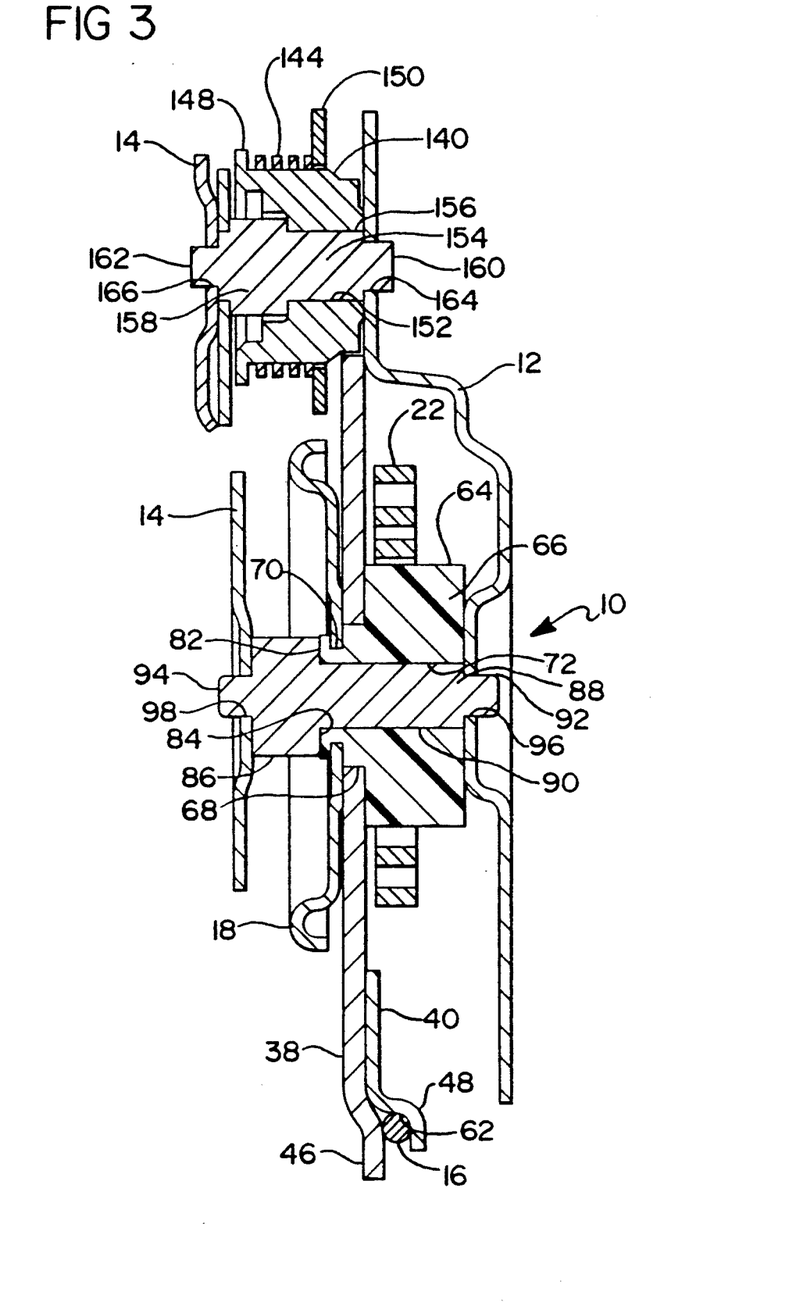
FIG. 3 an enlarged sectional view, taken along line 3—3 of FIG. 2.

A stepped bushing 64 has a large hub 66, an intermediate hub 68, a small hub 70 and a central bore 72. Take-up spring 22 has an inner end 74 received in a retention slot 76 in hub 66 and winds around hub 66, as best seen in FIGS. 2 and 3. Sector central aperture 44 receives intermediate hub 68 to rotatably mount drive plate 20 on bushing 64. The outer end 77 of spring 22 is hooked around a stud 78 mounted in hole 80 of sector 38.

Small hub 70 is received in octagonal central aperture 28 of pedal lever 18. Hub 70 is then upset to fill in aperture 28 and provide a mechanical driving connection between bushing 64 and pedal lever 18. This upset is a precision operation which provides a smooth, flat flange 82 on hub 70 that abuts face 84 of a spacer hub 86 of a pivot rivet 88 which includes a barrel 90 that is received in bore 72 of bushing 64 that is rotatable thereon. Pivot rivet 88 has ends 92 and 94 that are received in mounting holes 96 and 98 of mounting bracket 12 and cover plate 14, respectively.

As a result, pedal lever 18 is rotatable on pivot rivet 88 via the driving attachment to bushing 64, while drive plate 20 is independently rotatable on bushing hub 68 relative to pedal lever 18. Drive clutch 24 provides a releasable driving connection between pedal lever 18 and drive plate 20 so that operation of pedal lever 18 will variably tension cable 16 to operate the parking brake.

Drive clutch 24 comprises a pinion 100 having gear teeth 102 adjacent a hub 104. Teeth 102 are in constant driving mesh with sector gear teeth 42, forming a gearset of pinion 100 and sector 38. A torsion clutch spring 106 tightly embraces hub 104 and is confined by pinion flange 108 and a torsion plate 110. Pinion 100 has a hole 112 which receives the shank 114 of a pivot rivet 116. Pivot rivet 116 has a spacer hub 118 and a rivet stud 120 that is inserted into a mounting hole 122 in lever arm 30 and upset.

Torsion clutch spring 106 has one end 124 that is free and another end 126 that is captured in slot 128 of an anchor plate 130 which is mounted to pedal lever arm 30, along with tail 132 of torsion plate 110 by screws (not shown). Ends 124 and 126 are spread to enlarge spring 106 to enable installation onto pinion hub 104. Upon release, the coils of torsion spring 106 tightly clutch pinion hub 104.

Position control clutch 26 is similarly constructed. Clutch 26 comprises a pinion 140 having gear teeth 142 adjacent a hub 144. Teeth 142 are in constant driving mesh with sector gear teeth 42, forming another gearset of pinion 140 and sector 38. A torsion clutch spring 146 tightly embraces hub 144 and is confined by pinion flange 148 and a torsion plate 150. Pinion 140 has a hole 152 which receives the shank 154 of a pivot rivet 156. Pivot rivet 156 has a spacer hub 158 and rivet studs 160 and 162 that are received into mounting holes 164 and 166 in mounting bracket 12 and cover plate 14.

Torsion clutch spring 146 has one end 168 that is free and another end 170 that is captured in slot 172 of an anchor plate 174 which is mounted to cover plate 14 along with tail 176 of torsion plate 150 by screws (not shown). Ends 168 and 170 are spread to enlarge spring 146 to enable installation onto pinion hub 144. Upon release, the coils of torsion spring 146 tightly clutch pinion hub 144.

Take-up spring 22 is installed in a wound-up, or stressed (approximately 30 inch-pounds), condition between pedal lever 18, via bushing slot 76, and drive plate 20, via sector stud 78. Since drive clutch spring end 126 is anchored to pedal lever arm 30, pinion 100 cannot normally rotate counterclockwise, as viewed in FIG. 2 and in phantom in FIG. 6. Drive clutch 24 provides an operative driving connection between pedal lever 18 and drive plate 20, because the spring coils tightly grip pinion hub 104 and this motion would tend to wind the spring coils more tightly around pinion hub 104. This isolates take-up spring 22.

Figure 1:
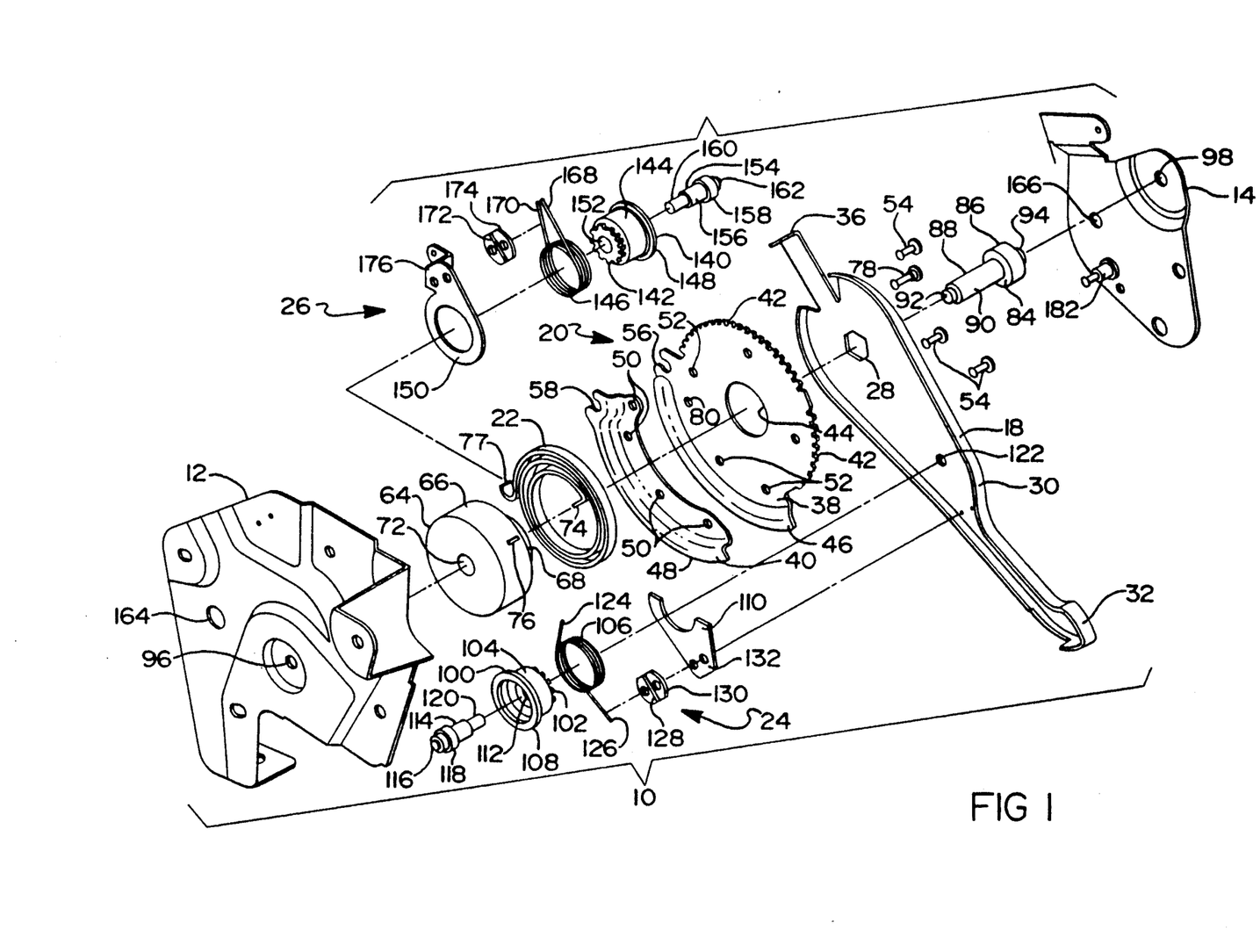
FIG. 1 is an exploded perspective view of a parking brake actuator according to this invention.

Operation of parking brake actuator 10 will now be described. In the brake release position depicted in FIG. 2, pedal lever 18 engages a bumper stop 180 mounted on cover plate 12. In this position, as shown in solid lines in FIG. 6, clutch torsion spring free end 124 is forced against a release or kick-out pin 182 mounted on cover plate 14 (see FIG. 1). Since spring end 126 is anchored to pedal lever 18, the resultant movement of free end 124 away from it expands the spring coils from the solid line position to the phantom line position in FIG. 6 (amount of actual movement is nearly imperceptible, but is exaggerated for illustrative purposes), freeing pinion 100 for rotation. Parking brake actuator 10 is now in the position of FIG. 2 and, since pinion 100 can now idle over sector teeth 42, pedal lever 18 is operatively disengaged from drive plate 20 and drive clutch 24 is disabled.

With drive clutch 24 disabled, spring 22 can now stress to cable 16. During initial installation of the parking brake 10, this provides an initial cable stress to take-up any slack in the system connecting the cable to the parking brake which occurs during installation. During repeated operation of the parking brake, any slack, caused by stretching of cable 16 or any change in the cable run geometry of the cable system, will automatically be removed by take-up spring 22 when drive clutch 24 is disabled in the brake apply position of FIG. 2.

Figure 4:
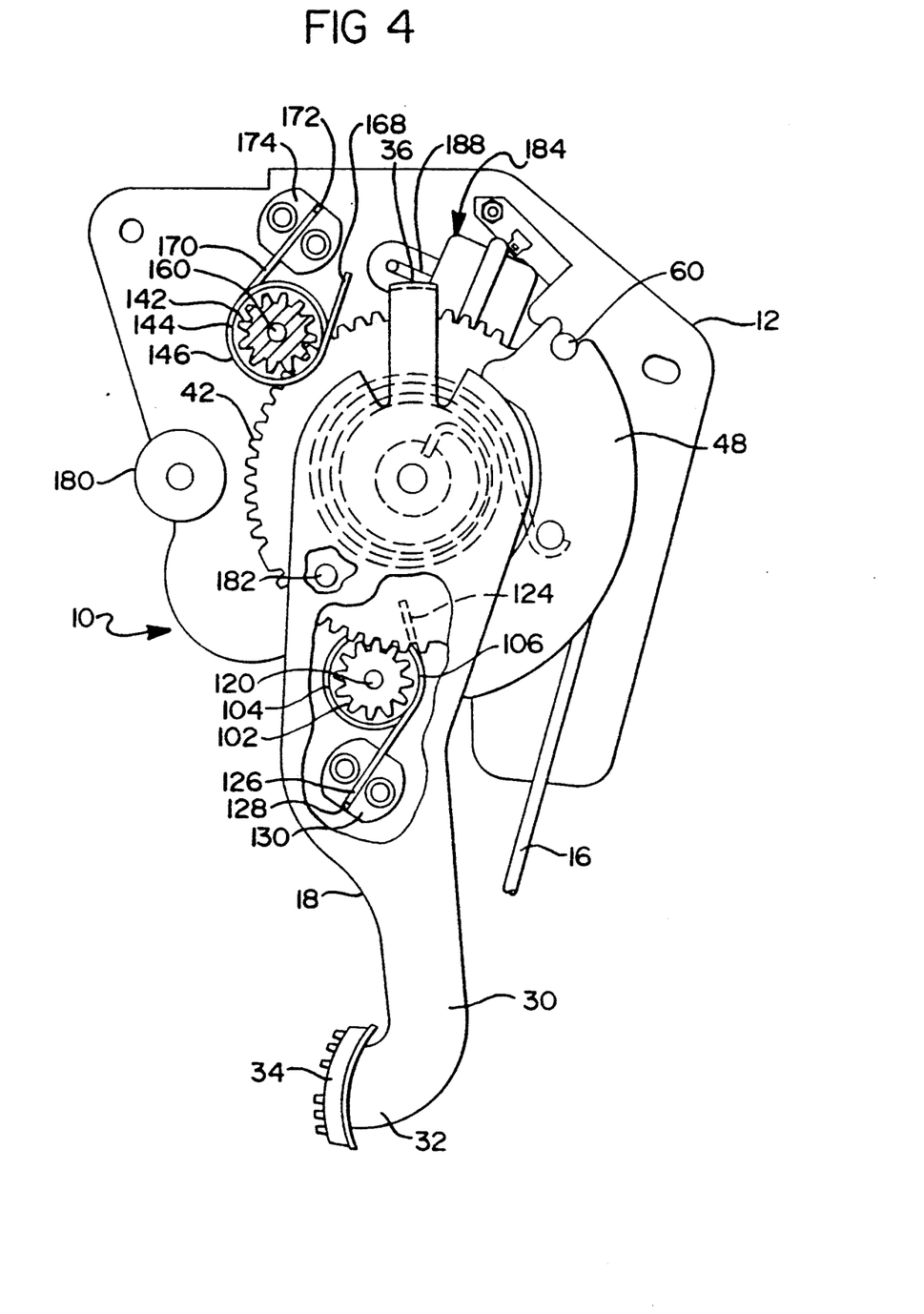
FIG. 4 is a view similar to FIG. 2, with the parking brake actuator shown in brake apply position.
Figure 6:
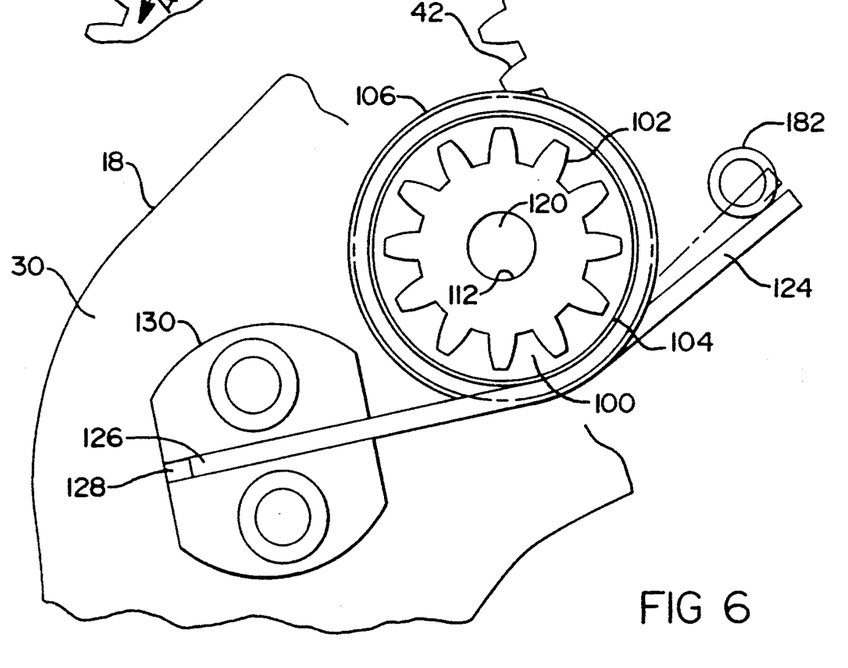
FIG. 6 is an enlarged detail view of the drive clutch of the parking brake actuator of this invention which illustrates its operation in exaggeration.

To apply the parking brake, pedal 18 is depressed, disengaging torsion clutch spring free end 124 from release pin 182, moving spring 106 from the solid line position to the phantom line position in FIG. 6. This enables the spring coils to tightly grip pinion hub 104, operatively connecting drive plate 20 to pedal lever 18, as illustrated in FIG. 4. Further depression of pedal lever 18 causes rotation of drive plate 20, which winds up and increasingly stresses cable 16 to apply the parking brake.

Figure 5:
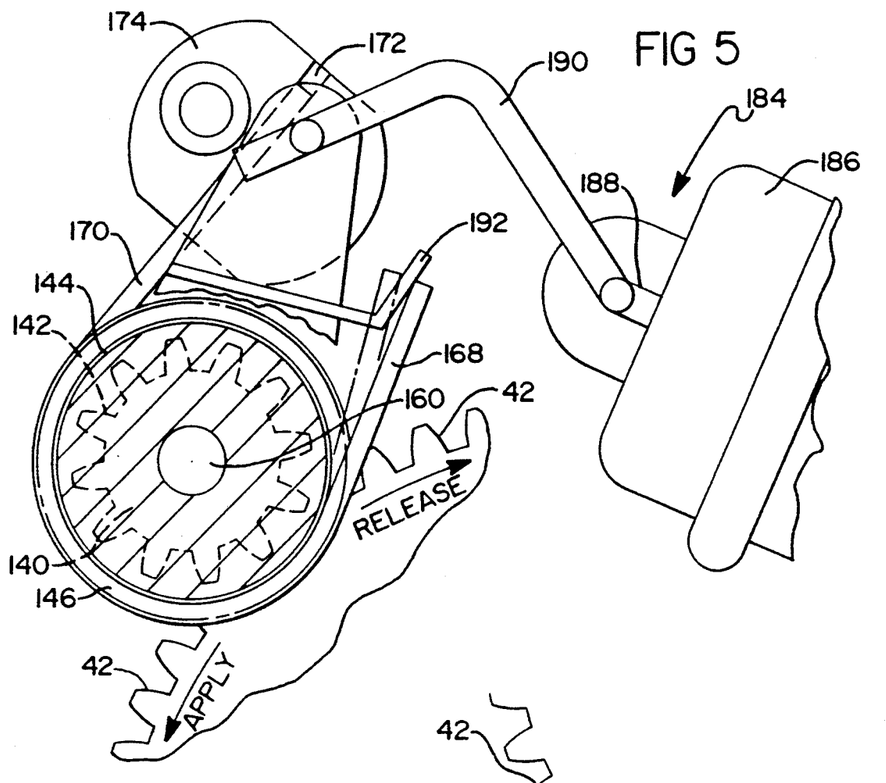
FIG. 5 is an enlarged detail view of the position control clutch of the parking brake actuator of this invention which illustrates its operation in exaggeration.

As shown in phantom lines in FIG. 5, the coils of control clutch torsion spring 146 tightly grip hub 144 of pinion 140, which has teeth 142 enmeshed with teeth 42 of sector gear 38. Movement of drive plate 20 by pedal lever 18 to apply the parking brake rotates sector gear 38 counterclockwise, as viewed in FIGS. 2, 4 and 5. This forces pinion 140 to rotate clockwise, which tends to unwind spring 146, since spring end 170 is fixed. Although the coils of torsion spring 146 continue to grip pinion hub 144, it is with a lessening frictional force that produces a small retarding torque that is overwhelmed by the torque exerted by the vehicle driver via pedal lever in applying the parking brake. Thus, sector gear 38 is able to rotate in the apply direction to stress cable 16 to apply the parking brake.

Pedal lever 18 can be released in any position, such as shown in FIG. 4, whenever the vehicle driver has exerted enough force to set the parking brake. Upon release of pedal lever 18, position control clutch 26 will automatically prevent reverse rotation of sector 38 in the release position. This occurs because cable tension will attempt to rotate sector 38 clockwise and force pinion 140 to rotate counterclockwise (FIGS. 2, 4 and 5). Since spring end 170 is fixed, this action will force the coils of torsion spring 146 to wind up and more tightly grip pinion hub 144. This increasing friction force will produce a torque which always exceeds the torque resulting from the cable tension force. As a result, drive plate 20 will maintain cable 16 in the selected brake apply position.

Parking brake actuator 10 includes a power release 184 that includes a vacuum operator 186 mounted on mounting bracket 12. Vacuum operator 186 mounts an output arm 188 that is connected by a link 190 to torsion plate 150 which mounts a release finger 192. When it is desired to release the parking brake, vacuum operator 186 is actuated to force release finger 192 against torsion spring free finger 168 to move it to the solid line position of FIG. 5. Since spring end 170 is anchored to mounting bracket 12, the movement of free end 168 away from it expands the spring coils from the solid line position to the phantom line position in FIG. 5 (amount of actual movement is nearly imperceptible, but is exaggerated for illustrative purposes), freeing pinion 140 for rotation.

Since control clutch pinion 140 can now idle over sector teeth 42, position control clutch 26 is disabled and cable tension will force drive plate 20 to rotate toward brake release position, thus releasing the parking brake. This movement of drive plate 20 from the position of FIG. 4 to that of FIG. 2 carries pedal lever 18 with it via drive clutch 24. As pedal lever 18 engages bumper stop 180, release pin 182 spreads drive clutch spring free end 124 to disable drive clutch 24, as explained above. Drive plate 20 is again free to move relative to pedal lever 18 under the influence of take-up spring 22 until the designed cable pretension is attained.

While only a preferred embodiment has been illustrated and described, obvious modifications thereof are contemplated within the scope of this invention and the following claims. Another type of position control clutch and another type of power release can be used. Also, a manual release for the position control clutch can be used.

We claim:

1. A parking brake actuator for variably tensioning a cable, comprising:
   a mounting bracket,
   a drive plate having an outer periphery attached to the cable and mounted on the mounting bracket for rotation between positions variably tensioning the cable,
   an operating lever mounted on the mounting bracket for rotation between a brake release position and a plurality of brake apply positions,
   a prestressed spring extending between the drive plate and the operating lever to bias the drive plate rotatably relative to the operating lever to apply an initial cable tension, a drive clutch including connecting means connecting the lever to the outer periphery of the drive plate for movement therewith immediately upon rotation of the lever out of brake release position thereby enabling further rotation of the lever to increase cable tension, a drive clutch release mounted on the vehicle for automatically releasing the clutch upon movement of the lever to brake release position, and a position control device for releasably maintaining the drive plate in brake apply position.

2. The parking brake actuator of claim 1, wherein the drive plate and operating lever are independently mounted on the vehicle for rotation about a common axis.

3. The parking brake actuator of claim 1, wherein the position control device comprises a one-way position control clutch which is mounted on the vehicle in engagement with the drive plate periphery and permits rotation of the drive plate to increase cable tension, but normally prevents any rotation of the plate to reduce cable tension, and a position control clutch release for selectively releasing the position control clutch to permit rotation of the drive plate to reduce cable tension.

4. The parking brake actuator of claim 1, wherein the drive clutch connecting means continuously engages the periphery of the drive plate.

5. The parking brake actuator of claim 1, wherein the drive clutch connecting means continuously and positively engages the periphery of the drive plate to provide a continuous mechanical driving connection between the operating lever and the drive plate.

6. The parking brake actuator of claim 1, wherein the drive plate has a plurality of gear teeth on its periphery forming a sector gear, and the drive clutch connecting means comprises a pinion rotatably mounted on the operating lever in engagement with the sector gear and a friction device which normally operates to engage the pinion to prevent its rotation, but is disabled by the clutch release to enable pinion rotation.

7. The parking brake actuator of claim 6, wherein the pinion has a hub, the friction device is a torsion clutch spring which is wrapped about the pinion gear hub, has a fixed end secured to the lever and a free end, and normally contracts to prevent rotation of the pinion gear, thus coupling the drive plate to the lever for rotation therewith, and a drive clutch release comprises a release member mounted on the mounting bracket for engagement by the torsion clutch spring free end in the brake release position of the lever to expand the spring to free the pinion for rotation, thus decoupling the drive plate from the lever.

8. A parking brake actuator for variably tensioning a cable, comprising a mounting bracket a drive plate attached to the cable which has a plurality of gear teeth on its periphery forming a sector gear and is mounted on the mounting bracket for rotation to variably tension the cable, an operating lever pivotally mounted on the mounting bracket for independent rotation between a brake release position and a plurality of brake apply positions, a spring extending between the drive plate and the operating lever and applying an initial tension on the cable, a drive clutch including connecting means coupling the drive plate to the lever for movement therewith upon initial rotation of the lever out of brake release position to enable rotation of the lever to increasingly tension the cable and apply the parking brake, said connecting means including a pinion rotatably mounted on the operating lever in engagement with the sector gear and a friction device normally engaging the pinion to prevent its rotation, a drive clutch release mounted on the vehicle for disabling the friction device upon movement of the operating lever to brake release position to enable pinion rotation, thus decoupling the drive plate from the lever, and a position control device for releasably maintaining the drive plate in brake apply position.

9. The parking brake actuator of claim 8, wherein a the pinion has a hub, the friction device is a torsion clutch spring which is wrapped about the pinion gear hub, has a fixed end secured to the lever and a free end, and which normally contracts to prevent rotation of the pinion gear, thus coupling the drive plate to the lever for rotation therewith, and the drive clutch release is engaged by the torsion clutch spring free end in the brake release position of the lever to expand the spring to free the pinion for rotation.

10. The parking brake actuator of claim 9, wherein the drive plate and the operating lever are coaxial and the biasing spring is a spiral-wound spring.

11. A parking brake actuator for variably tensioning a cable, comprising a mounting bracket, a drive plate attached to the cable which has a plurality of gear teeth on its periphery forming a sector gear and is mounted on the mounting bracket for rotation about an axis to variably tension the cable, an operating lever pivotally mounted on the mounting bracket for independent rotation about said axis between a brake release position and a plurality of brake apply positions, a spiral-wound spring extending between the operating lever and the drive plate for rotating the drive plate relative to the lever to apply an initial tension on the cable, a drive clutch which couples the drive plate to the lever for movement therewith upon initial rotation of the lever out of brake release position to enable rotation of the lever to increasingly tension the cable, including a pinion gear rotatably mounted on the lever in engagement with the sector gear and having a hub, and a torsion clutch spring which is wrapped about the pinion gear hub, has a fixes end secured to the lever and a free end, and which normally contracts to prevent rotation of the pinion gear, thus coupling the drive plate to the lever for rotation therewith, a release pin mounted on the mounting bracket which is engaged by the torsion clutch spring free end in the brake release position of the lever to expand the torsion clutch spring to free the pinion for rotation, thus decoupling the drive plate from the lever, a position control device for releasably maintaining the drive plate in brake apply position comprising a second pinion gear rotatably mounted on the mounting bracket in engagement with the sector gear and having a hub, and a second torsion clutch spring, having a fixed end secured to the mounting bracket and a free end, which is wrapped about the second pinion gear hub and normally enables movement of the drive plate to increase cable tension, but contracts to prevent rotation of the pinion gear and prevent movement of the drive plate to decrease cable tension, and a position control device release mounted on the mounting bracket which is selectively engageable with the second torsion clutch spring free end to expand the second torsion clutch spring to free the pinion for rotation and enable movement of the drive plate to decrease cable tension.

12. A parking brake actuator for variably tensioning a cable, comprising a mounting bracket, a drive plate attached to the cable and mounted on the mounting bracket for rotation between positions variably tensioning the cable and having a plurality of gear teeth on its periphery forming a sector gear, an operating lever mounted on the mounting bracket for rotation between a brake release position and a plurality of brake apply positions, a spiral-wound spring extending between the drive plate and the operating lever to bias the drive plate rotatably relative to the operating lever to apply an initial cable tension, a drive clutch comprising a pinion having a hub rotatably mounted on the operating lever in engagement with the sector gear, and a torsion clutch spring which is wrapped about the pinion gear hub, has a fixed end secured to the lever and a free end, and normally contracts to prevent rotation of the pinion gear to enable movement of the drive plate with the lever immediately upon rotation of the lever out of brake release position thereby, enabling further rotation of the lever to increase cable tension, and a drive clutch release comprising a release member mounted on the mounting bracket which is engaged by the torsion clutch spring free end in the brake release position of the lever to expand the spring to free the pinion for rotation, thus decoupling the drive plate from the lever to automatically release the clutch upon movement of the lever to brake release position, and a position control device for releasably maintaining the drive plate in brake apply position.

* * * * *